United States Patent
Jiang et al.

(10) Patent No.: US 6,631,123 B1
(45) Date of Patent: Oct. 7, 2003

(54) METHOD OF IMPROVING USER ACCESS PERFORMANCE BY ADJUSTING POWER OF USER PROBE SIGNAL

(75) Inventors: Frances Jiang, Whippany, NJ (US); Robert Caiming Qiu, Rockaway, NJ (US); Liwa Wang, Morris Plains, NJ (US); Pengfei Zhu, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/395,911

(22) Filed: Sep. 14, 1999

(51) Int. Cl.⁷ .............................................. H04B 7/216
(52) U.S. Cl. ........................ 370/335; 370/342; 455/522
(58) Field of Search ................................ 370/313, 320, 370/335–342, 318, 344, 345, 346, 347, 441, 442, 252; 455/67.1, 67.3, 69, 522

(56) References Cited

U.S. PATENT DOCUMENTS

| | | | | |
|---|---|---|---|---|
| 5,345,598 A | * | 9/1994 | Dent | 455/127 |
| 5,715,238 A | * | 2/1998 | Hall et al. | 370/242 |
| 5,815,811 A | * | 9/1998 | Pinard et al. | 455/434 |
| 6,088,591 A | * | 7/2000 | Trompower et al. | 455/438 |
| 6,101,179 A | * | 8/2000 | Soliman | 370/342 |
| 6,167,056 A | * | 12/2000 | Miller et al. | 370/320 |
| 6,212,364 B1 | * | 4/2001 | Park | 455/69 |
| 6,256,301 B1 | * | 7/2001 | Tiedemann et al. | 340/2.1 |
| 6,347,120 B1 | * | 2/2002 | Sakoda | 375/259 |
| 6,366,779 B1 | * | 4/2002 | Bender et al. | 370/335 |
| 6,449,489 B1 | * | 9/2002 | Lu et al. | 455/506 |
| 6,498,785 B1 | * | 12/2002 | Derryberry et al. | 370/311 |

FOREIGN PATENT DOCUMENTS

| | | |
|---|---|---|
| EP | 0851612 | 7/1998 |
| EP | 0917304 | 5/1999 |
| EP | 1001556 | 5/2000 |

* cited by examiner

Primary Examiner—William Trost
Assistant Examiner—Marcos L Torres

(57) ABSTRACT

A method for adjusting the power of a probe signal to be transmitted by user equipment to system equipment of a wireless communication system. The power of the probe signal is adjusted based on information received by the user equipment from the system equipment. The information is a local mean of RSSI at the system equipment. The adjusted probe signal is transmitted and thus has an increased likelihood of being detected by the system equipment. Also, the power available for transmitting the probe signal is used more efficiently when the probe signal is adjusted in accordance with the local mean information received by the user equipment from system equipment of the wireless communication system.

21 Claims, 6 Drawing Sheets

METHOD OF IMPROVING USER ACCESS PERFORMANCE BY ADJUSTING POWER OF USER PROBE SIGNAL

BACKGROUND OF THE INVENTION

1. Field of the Invention

The present invention is generally related to a method of improving a user's ability to gain access to a communication system and in particular to a method of adjusting the power of a user equipment probing signal to increase the likelihood of detection by the communication system equipment.

2. Description of the Related Art

Communication systems, and in particular, wireless communication systems comprise a plurality of communication channels through which subscribers of such systems communicate with each other and with the system. A portion of a typical wireless communication system is shown in FIG. 1. The wireless communication system of FIG. 1 depicts a cellular system comprising cells (e.g., 102, 104, 106, 108) whereby each cell is a symbolic representation of the physical terrain or geographical region covered by communication network equipment commonly known as cell sites or base stations (e.g., 110, 112, 114). Each base station has system equipment comprising radio equipment (i.e., transmitter, receiver, modulator, demodulator) that are used to transmit and/or receive communication signals between a base station and a user equipment. The system equipment can also be located at places other than base stations. The term "user" hereinafter is used interchangeably with the term "subscriber" to indicate an entity (i.e., person, facility or a combination thereof) who is allowed access (when possible) to the communication system. Access to the communication system is the ability of a subscriber to make use of the resources (e.g., system equipment, communication channels) of the communication system. The user equipment (e.g., 140 in cell 104) is typically a cellular phone or any other communication equipment that is used by a subscriber of a communication system. For example, the user equipment can be a wireless portable computer or a pager. The system equipment further comprises processing equipment for retrieving information being carried by the communication signals and for implementing procedures based on communication protocols. A communication protocol is a set of procedures or processes that dictate how communications between users of the communication system is to be initiated, maintained and terminated. The communication protocol also dictates the communications between a user and system equipment. Communication protocols are part of well known and established standards that are followed by operators of communication systems.

Still referring to FIG. 1, each user communicates with a base station via a wireless communication link. For example in cell 104, user 140 communicates with base station 114 via communication link 156. Typically, each wireless communication link comprises several communication channels. For example, for a Code Division Multiple Access (CDMA) wireless system, the communication link comprises an Access channel, a Paging channel and a Traffic channel. The Access channel is a channel through which user equipment transmits protocol information to a base station. The protocol information is information used by the system equipment operate and/or control the communication system. For example, a user requesting access to the communication system is allowed to use the communication system after various protocol information have been exchanged between the base station and the user equipment. In allowing the user to have access to the communication system, the system equipment identifies the user as a subscriber of the system, finds resources (e.g., communication channels, base station equipment) that can be made available to the user and allows the user to use (transmit/receive information) such resources in accordance with the protocol being followed by the communication system. The Paging channel is a channel through which system equipment (e.g., base station) broadcasts protocol information to users of the communication system. The traffic channel is the channel used by the users to communicate with each other or with the system. The information conveyed through the traffic channel is, for example, voice, data, video, facsimile information or any other information typically conveyed by users of communication systems. The traffic channel consists of two channels: the first channel is called the reverse link through which users transmit information which information is received by the base station (or other system equipment); the second channel is called the forward link through which the base station (or other system equipment) transmits information to a user. Each user has a forward link and a reverse link assigned by the communication system. In addition to the other channels discussed above, some CDMA systems also have a pilot channel that is used to assist a user to obtain access to the communication system.

The pilot channel is a channel through which the system equipment broadcasts, on a continuous basis, a pilot signal that covers a certain area (e.g., cell area) of the communication system. The pilot signal serves as a sort of beacon signal that assists users to obtain access to the communication system. The pilot signal is also one of several signals used by users to synchronize their timing to the timing of the communication system.

A user initiates a request for access to the communication system by transmitting a protocol signal called a probe signal. The probe signal has two portions: the first portion is called the preamble which is typically a repetitive signal (i.e., a string of "0" bits or a string of "1" bits); the second portion is a message portion containing protocol information. The preamble is the portion of the probe that allows the base station (or other system equipment) to detect the probe. The probe signal once detected by the system equipment initiates a certain procedure (in accordance with a protocol being followed by the communication system) to provide access to the user that transmitted the probe signal. Prior to initiating the procedure, the system equipment transmits an "acknowledge" (ACK) message to the user equipment indicating to the user equipment that the probe signal has been detected. Once the user equipment receives the ACK message it no longer transmits the probe signal and proceeds as per the protocol to obtain access to the communication system.

In many cases the probe signal is not detected by the system equipment. In such cases, the user equipment transmits the probe signal repeatedly until it receives the ACK message. For each repeated transmission of the probe signal, the power of the probe signal is increased by a system defined amount hereinafter referred to as "Δ." A graph of the power of the probe signal versus time is shown in FIG. 2. Each probe is transmitted after a certain time interval $\tau + \tau_{r_i}$ where $\tau$ is a system defined time interval and $\tau_{r_i}$ is a time interval of random length for the $i^{th}$ probe signal. Thus, according to the graph of FIG. 2, the first probe has a power of $P_1$, the second probe has a power of $P_2$, the third probe has a power of $P_3$ and so on. In general, the probe power can be expressed by the following equation:

(1) $P_i = P_0 + \Delta i$ where the $i^{th}$ probe has power $P_i$ and the initial probe power is $P_0$. $P_0$ is a system defined value that represents the initial probe power after having been modified based on the measured power of the pilot signal.

The base stations are designed to simultaneously receive signals from a plurality of users. For example, base station 114 in cell 104 not only receives the probe signal from user 136, but also receives other signals from the other users (e.g., user 146, user 144, user 140, user 138) in cell 104. From the point of view of user 136, the signals from the other users adversely affect base station 114's ability to detect a probe signal from user 136. The signals from other users—from the point of view of user 136—are interference that interfere with the detection of a probe signal from user 136. Also, although base station 114 is designed to receive signals from users located in cell 104 (and other users who are subscribers to the communication system), it also receives signals from other sources which are not subscribers of the communication system. The signals from these other sources are also interference; that is interference is any signal that is not from a subscriber of the system, but which is nonetheless received and detected by system equipment. The system equipment at base station 114 also generates what is commonly called thermal noise, which is a type of noise signal generated at base station 114; the thermal noise is created from electrical circuitry and other types of circuitry located at the base station. The total power (from the various signals) received by base station 114 (as well as any other base station) due to user signals, interference and thermal noise is called the received signal strength indicator (RSSI). Therefore, the RSSI comprises two components, viz., interference and received user signals.

In general, there are three main factors which adversely affect the base station's (e.g., base station 114) ability to detect a probe signal from a user such as user 136. The probe signal experiences what is commonly known as mean path loss which is signal attenuation due to the physical distance between a user and the base station receiving equipment; that is, the longer the distance, the higher the path loss experienced by the probe signal.

The second factor is a phenomenon called "fading." The term fading generally relates to adverse effects on the probe signal (and other signals received by the base station) due to obstacles (buildings, towers and other tall structures) located between a user and the base station. A probe signal experiences different types of fading depending on the particular physical demographics of the terrain covered by a communication system. One type of fading is commonly known as "Raleigh fading" and another type of fading is called "Log Normal fading" or shadowing. The fading phenomenon is manifested as amplitude (or power) variations in signals received by base station equipment. Fading is often graphically depicted as signal amplitude (or power) vs. time as shown in FIGS. 3 and 4. FIG. 3 depicts a typical Raleigh fading curve; FIG. 4 depicts a typical Log Normal fading curve. Generally, as can be clearly discerned from FIGS. 3 and 4, the variations in a signal's amplitude (or power) due to Raleigh fading occur more frequently than variations due to Log Normal fading.

The third factor is a random variation in RSSI at the base station. This random variation is directly related to the random nature of subscribers gaining access or terminating usage of the communication system. The RSSI varies with time based on the number of users making use of the system at any particular time and reflects the fading characteristics being experienced by a particular base station. As discussed earlier the different types of fading can be expressed in terms of power received by a base station. When the fading is graphically depicted as power vs. time and thus the variations include the components of the RSSI, FIGS. 3 and 4 become FIGS. 5 and 6 respectively. Therefore, FIGS. 5 and 6 depict not only variations due to fading but also variations due to changing RSSI at a base station.

As discussed earlier, the power transmitted by a probe signal is increased by a specific amount (see equation (1)) until the probe signal is detected by the base station. Whenever, a user equipment has to keep increasing its probe signal power level, the likelihood of the probe signal interfering with neighboring base stations increases. For example, referring to FIG. 1, in cell 104 user 136 because of its proximity to cell 102 may be transmitting a probe signal (to base station 114) that interferes with base station 110. Because of the variations in RSSI as shown in FIGS. 5 and 6, the power level of the probe signal must be adjusted accordingly to increase the likelihood that the probe signal is detected by the base station. For example, the A amount of power added to the probe signal may not be enough for the base station equipment to detect the probe signal. In such a case the probe signal is unable to compensate for the increase in RSSI experienced by the base station. As a result, a number of probe signals have to be transmitted before detection, if ever, by the base station 114 occurs. In such a case, not only does such a probe signal is increasingly likely to interfere with a neighboring base station, but the user equipment has to wait for a relatively long period of time before it gains access to the communication system.

The variations in RSSI may be such that the A power amount added to the probe signal may be unnecessarily high. In such a case an over adjustment is made to the probe signal and thus the user equipment is using its available transmission power inefficiently. The probe signal, in such circumstances need relatively slight adjustments for detection by the base station equipment.

What is therefore needed is a method of adjusting the power of a probe signal such that the likelihood of such a probe signal being detected by system equipment is increased. What is also needed is a method that adjusts the power of a probe signal in an efficient manner.

SUMMARY OF THE INVENTION

The present invention provides a method for adjusting a probe signal to be transmitted by user equipment of a communication system so as to increase the likelihood that the probe signal is detected by system equipment of the communication system. The adjustment made to the probe signal is based on information about characteristics of signals received by the system equipment which information is transmitted to the user equipment from the system equipment.

In particular, the method of the present invention comprises the steps of receiving information about adjustments to be made to a probe signal that is to be transmitted. The adjustments are made to the probe signal based on the received information. The adjusted probe signal is then transmitted to the system equipment thus having an increased likelihood of being detected by the system equipment and the power available for the probe signal is used in a more efficient manner.

In a preferred embodiment of the method of the present invention, the information represents a local mean of RSSI at the system equipment. The local mean is used by user equipment (e.g., cell phone) to adjust (increase or decrease) the probe signal's power level so as to substantially increase the likelihood that the probe signal will be detected by the system equipment (e.g., base station equipment) and also enables the user equipment to use the power available for the probe signal more efficiently.

DETAILED DESCRIPTION

The present invention provides a method for adjusting a probe signal to be transmitted by user equipment so as to increase the likelihood that such probe signal is detected by system equipment of a communication system. The user equipment adjusts the probe signal based on information received from the system equipment. In a preferred embodiment, the information represents a local mean of RSSI at the system equipment and thus probe signal's power is adjusted accordingly. As a result, the likelihood of the probe signal interfering with other system equipment is decreased and the power available for the probe signal is used in a more efficient manner.

Figure 1:
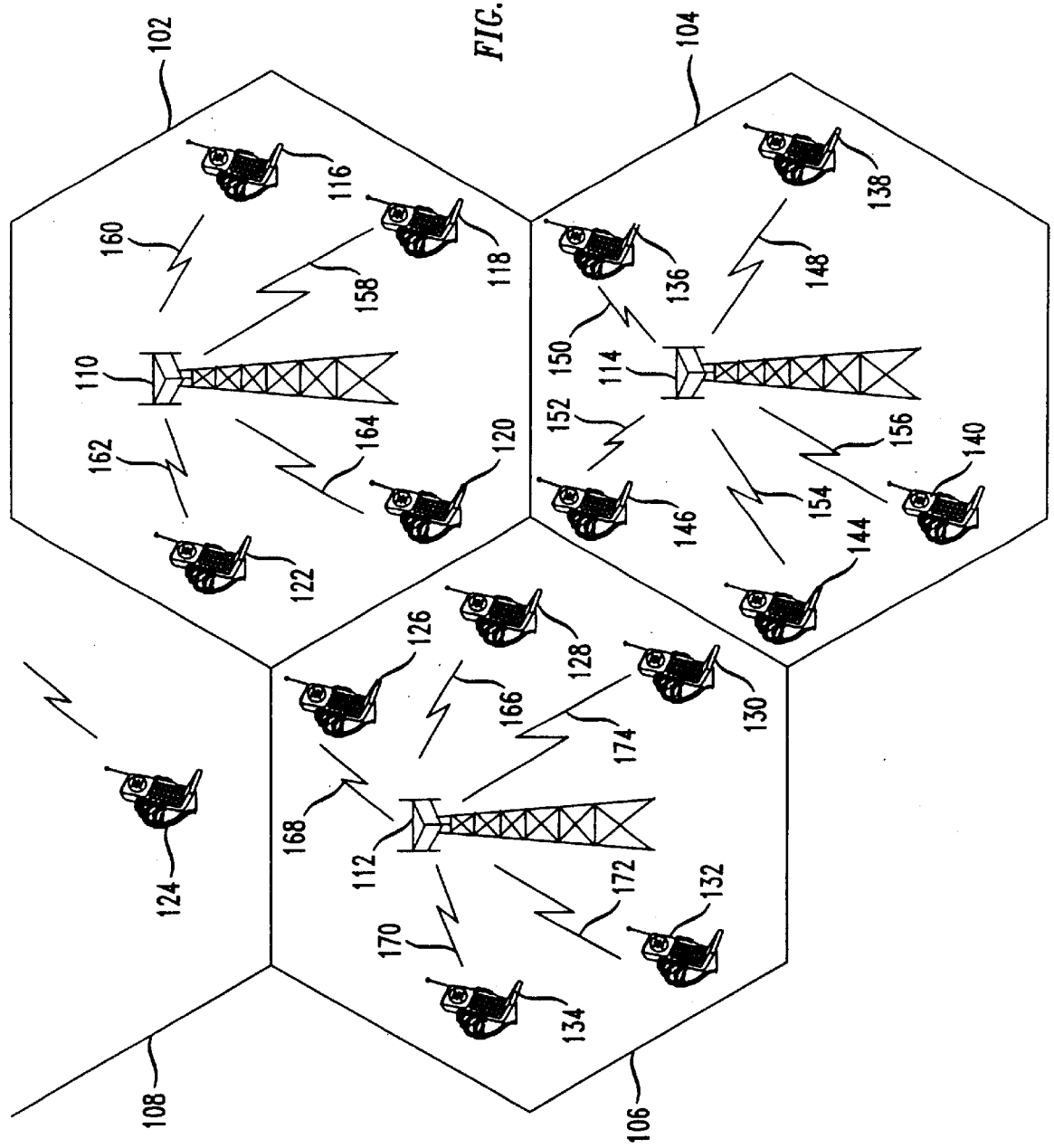
FIG. 1 depicts a typical topology of part of a cellular communication system.
Figure 2:
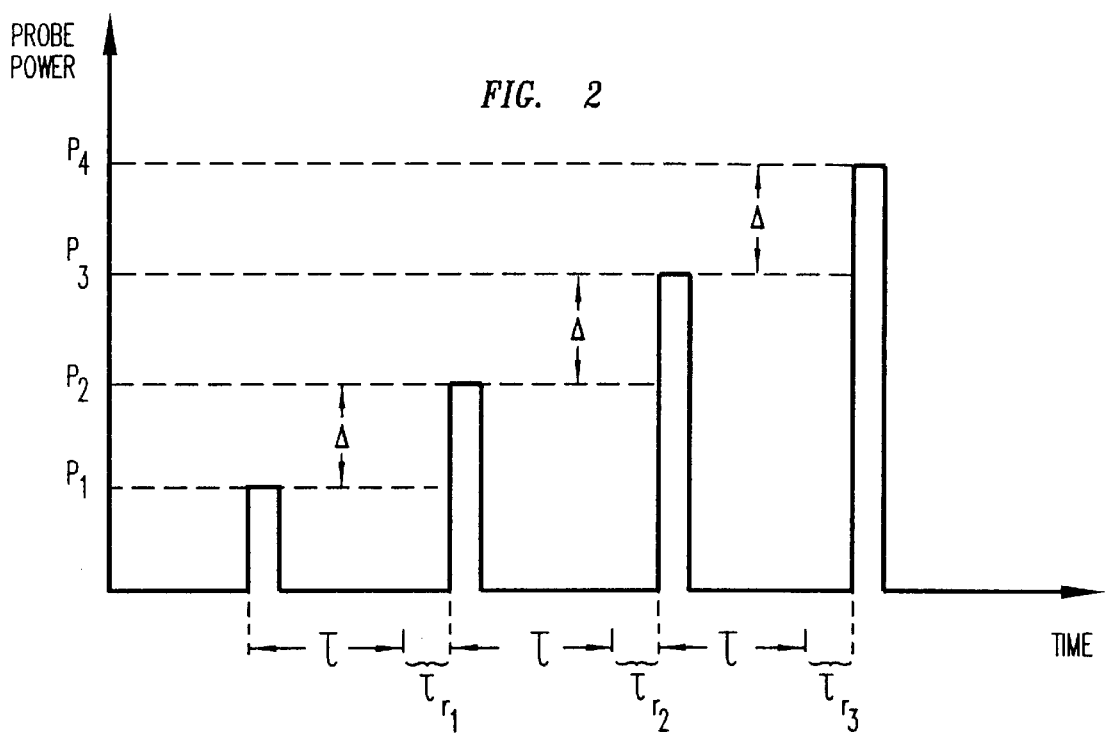
FIG. 2 is graph of probe signal power level versus time.
Figure 3:
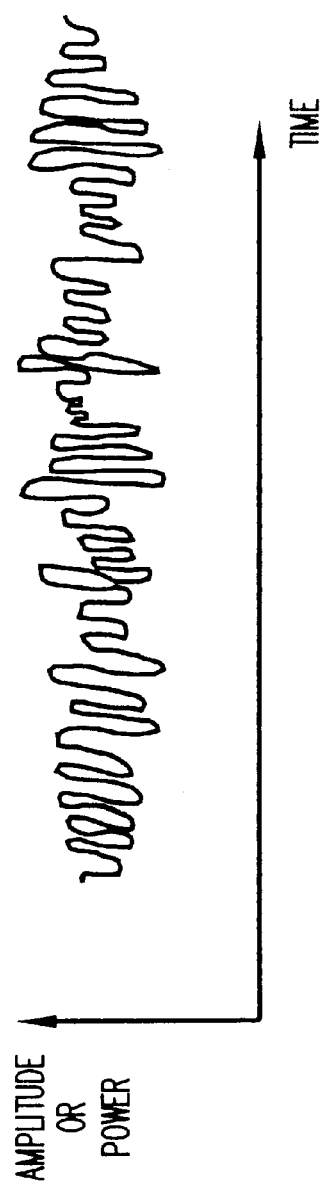
FIG. 3 is a graph of amplitude or power of signals with Raleigh fading characteristics received at a base station.
Figure 4:
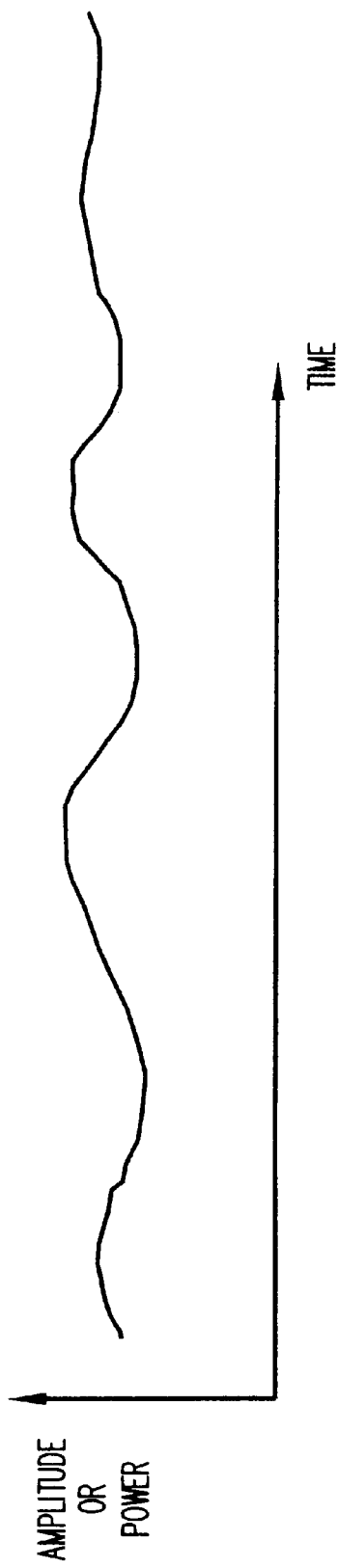
FIG. 4 is a graph of amplitude or power of signals having experienced Log Normal fading.
Figure 6:
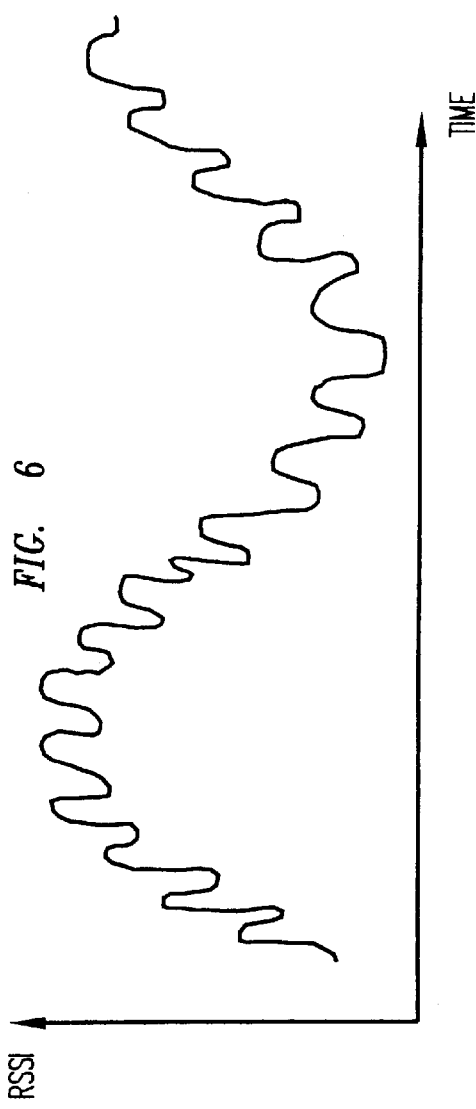
FIG. 6 is a graph of RSSI having experienced Log Normal fading.
Figure 7:
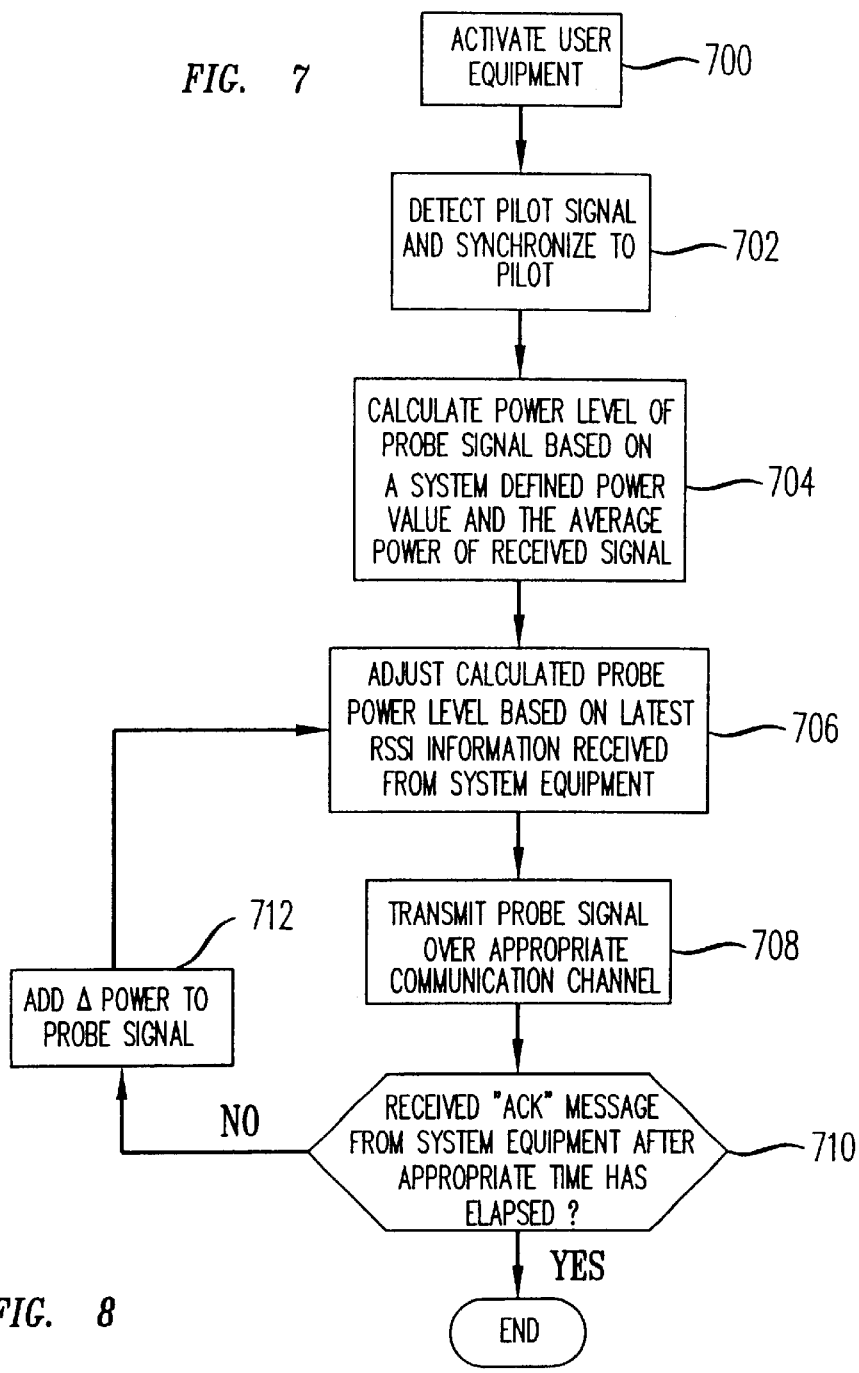
FIG. 7 is the method of the present invention for the user equipment.

Referring to FIG. 7, there is shown the method of the present invention for user equipment. For the sake of simplicity and for ease of discussion, the method of the present invention is described in terms of a wireless cellular CDMA communication system that complies with the well known IS-95 standard. It will be understood however that the method of the present invention is applicable to other types of wireless communication systems. Again referring to FIG. 1, user equipment 136 of cell 104 having base station 114 will be used to describe the method of the present invention for user equipment. Referring back to FIG. 7, in step 700, user equipment 136 is activated (i.e., cell phone is switched on). In step 702, the pilot signal being transmitted by base station 114 is detected by user equipment 136. User equipment 136 not only detects the pilot signal, but synchronizes its circuitry to the pilot signal.

In step 704, an initial power of probe signal is calculated by the user equipment. The initial power value is based on a communication system defined value (or a value established by operator) and the mean input signal power of a received signal (i.e., average of total power of received signal). The received signal includes a pilot signal from a base station of the cell within which the user equipment is located. The received signal may also include received pilot signal from a base station of a neighboring cell. The power level of the received signal is measured by the user equipment and the initial value of the power of the probe signal is altered based on the measured power level of the received signal. For example, if the power level of the received signal is lower than a system defined threshold, it is an indication that the communication link (i.e., link 150) is adversely affecting the received signal. The power of the probe signal is increased accordingly to compensate for the adverse effects. The adverse effects are typically mean path loss and channel fading.

Figure 5:
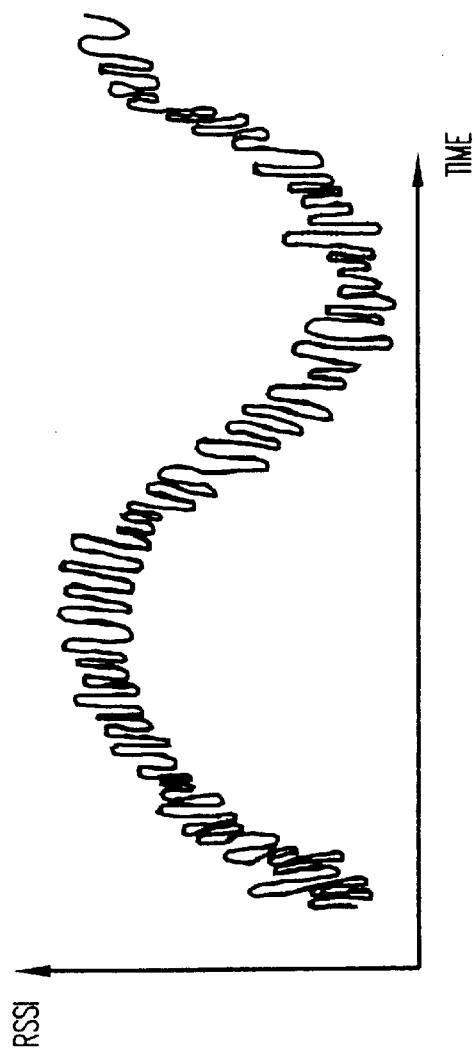
FIG. 5 is graph of RSSI having experienced Raleigh fading.
Figure 5A:
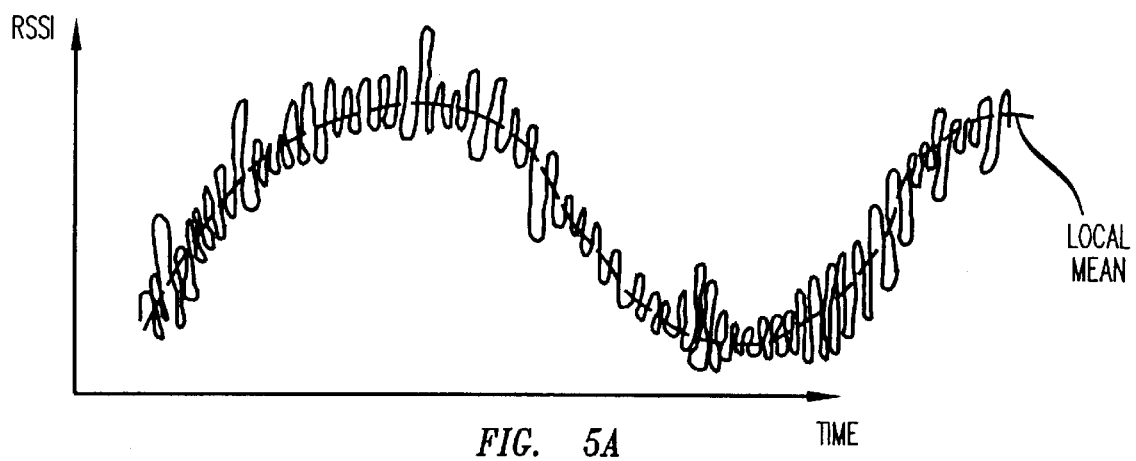
FIG. 5A is FIG. 5 with the local mean of the RSSI shown.
Figure 6A:
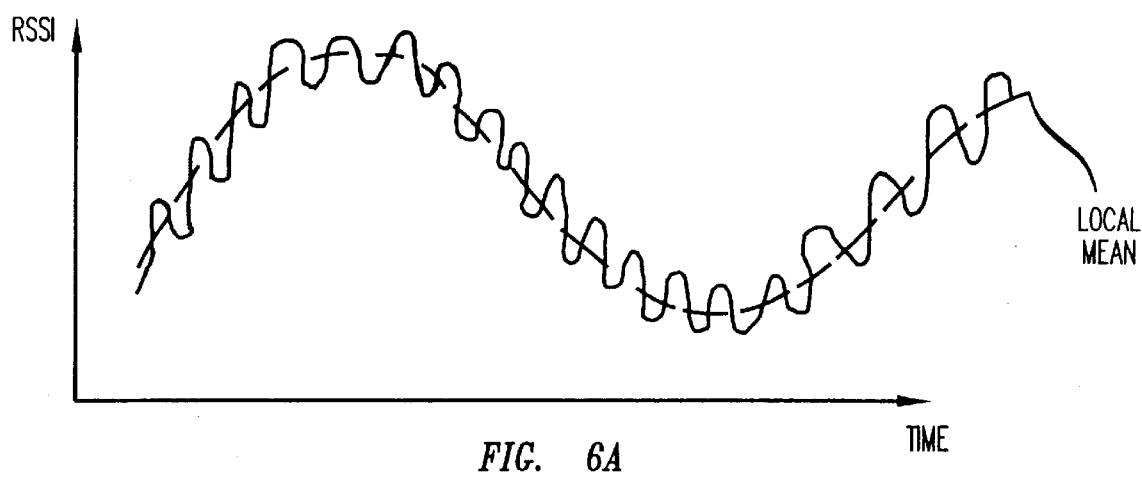
FIG. 6A is FIG. 6 with the local mean of the RSSI shown.

The addition of Δ may overcome the mean path loss and the fading effects but it is difficult, if not impossible, to overcome the variations in RSSI due to users gaining access or terminating usage of the communication system. Base station 114 is able to measure its RSSI at particular instances of time. More importantly, base station 114, as dictated by the method of the present invention, calculates a local mean of the RSSI. The local mean is a statistical averaging or probabilistic averaging or arithmetic averaging of a certain number of RSSI values. FIGS. 5A and 6A show the graph of the local mean for a Raleigh fading RSSI and a Log Normal fading RSSI respectively. Base station 114 broadcasts the local mean as a portion of protocol information which is received by user equipment 136. User equipment 136 retrieves that portion of the protocol information for the adjustment of.the probe signal.

Referring again to FIG. 7, in step 706, user equipment 136 adjusts the power of the probe signal based on the portion of the latest protocol information (i.e., local mean of RSSI) received from base station 114. In step 708, user equipment 136 transmits the adjusted probe signal over the appropriate channel. In step 710, user equipment waits for the ACK message from base station equipment 114. In accordance with the IS-95 standard, user equipment 114 waits for a system defined amount of time for the ACK message. If an ACK message is detected, base station 114 has received and detected the probe signal and therefore, user equipment 114 can continue to communicate with base station 114 to obtain access to the communication system.

If an ACK message is not detected within the defined amount of time, the method of the present invention moves to step 712 where a Δ is added to the probe power. The method of the present invention then moves to step 706 where user equipment 114 waits for the next broadcast of the RSSI local mean to further adjust the probe power. Thus, the probe signal is adjusted based on the latest received information and is then transmitted. Firmware or software of the user equipment can be modified to implement the method of the present invention. The method of the present invention can also be implemented with well known digital and analog hardware that is part of the user equipment.

Figure 8:
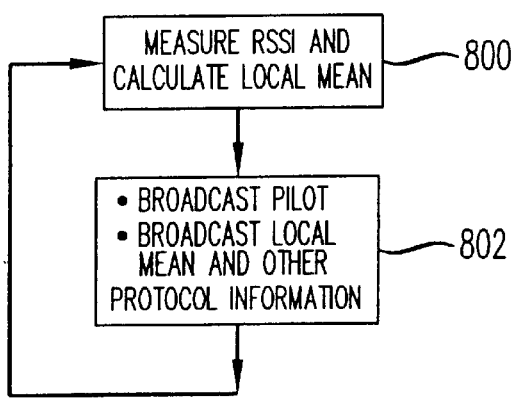
FIG. 8 is the method of the present invention for system equipment.

Referring now to FIG. 8 which shows the method of the present invention for system equipment (e.g., base station equipment). In step 800, the system equipment measure the RSSI at specific instances of time. The system equipment calculate a local mean of the RSSI as discussed previously. The local mean information is inserted in the Access Parameter message that is to be broadcast over the Paging channel as per the IS-95 standard. In another embodiment of the method of the present invention, the local mean information is formatted as a separate message called a short message. The short message is a message distinct from the Access Parameter message and the System Parameter message. The short message, although not currently part of the IS-95 standard, represents another technique for conveying information about adjustments to be made to the probe signal.

In step 802, the system equipment broadcast a pilot signal. The system equipment also broadcast protocol information over the various protocol messages, including the Access Parameter message containing the local mean information, and the System Parameter message. In a CDMA communication system that complies with the IS-95 standard, the System Parameter Message and the Access Parameter Message broadcast by the system equipment are used by the user to obtain access to the communication system. In another embodiment, the short message is transmitted between transmissions of Access Parameter messages. The local mean information or other adjustment information is stored in the short message. It should be noted that the information broadcast by the system equipment need not be limited to the local mean of the RSSI. Other characteristics (e.g., signal amplitude, signal phase response, signal frequency content) of the signals received by the system equipment can be broadcast by the system equipment for use by user equipment to adjust the probe signal so as to increase the likelihood of the probe signal being detected by the system equipment. In general, the system equipment broadcast adjustment information used by the user equipment to adjust at least one characteristic of the probe signal. It should also be noted that the method of the present invention for system equipment can be implemented through software modification of the system equipment or through hardware modifications or firmware modifications. After each broadcast of the adjustment information (e.g., local mean), the system equipment wait for a system defined period of time before another measurement and broadcast are performed.

We claim:

1. A method for adjusting a probe signal to be transmitted by a user equipment of a communication system, comprising:

retrieving at least a portion of a latest protocol information received from the communication system, the latest protocol information including a local mean of radio signal strength indicator (RSSI) values of a system equipment serving the user equipment; and adjusting the probe signal based on the local mean.

2. The method of claim 1, wherein said adjusting further includes transmitting the adjusted probe signal to the system equipment.

3. A method for adjusting a probe signal to be received by system equipment of a communication system, comprising:

broadcasting information that includes protocol information, the protocol information including a local mean of radio signal strength indicator (RSSI) values of the system equipment to be used for adjusting the probe signal; and receiving a probe signal that has been adjusted in accordance with said local mean within the protocol information.

4. The method of claim 3, wherein said local mean within the protocol information is to be used to adjust a characteristic of the probe signal.

5. The method of claim 3, wherein said broadcasting further includes:

measuring a plurality of RSSI values of system equipment at different times;

calculating a local mean of the RSSI values; and inserting the calculated local mean into information to be broadcast.

6. The method of claim 5, wherein the communication system is a CDMA system that complies with the IS-95 spectrum and the local mean is placed in an Access Parameter Frame.

7. The method of claim 5, wherein the local mean is placed in a short frame.

8. A method for adjusting a characteristic of a probe signal transmitted by user equipment of a communication system, comprising:

receiving a latest protocol information from system equipment of the communication system, the latest protocol information including a local mean of radio signal strength indicator (RSSI) values of a system equipment serving the user equipment;

retrieving the local mean from said latest protocol information, said local mean related to the characteristic of the probe signal; and adjusting the characteristic of the probe signal based on the retrieved local mean.

9. The method of claim 8, wherein said receiving further includes receiving a message containing said latest protocol information.

10. The method of claim 9, wherein the communication system is a CDMA system that complies with the IS-95 spectrum and the received message is an Access Parameter message.

11. The method of claim 9, wherein the communication system is a CDMA system that complies with the IS-95 spectrum and the received message is a short message.

12. The method of claim 8, wherein said adjusting further includes transmitting the probe signal.

13. The method of claim 12, wherein said transmitting further includes:

waiting for an ACK message from the system equipment for a system defined amount of time;

adjusting the probe signal based on the latest received protocol information.

14. The method of claim 8, wherein said adjusting the characteristic further includes adjusting the probe signal's power based on the retrieved local mean.

15. The method of claim 8, wherein said adjusting the characteristic further includes adjusting the probe signal's phase based on the retrieved local mean.

16. The method of claim 8, wherein said adjusting the characteristic further includes adjusting the probe signal's frequency content based on the retrieved local mean.

17. A method by which a user equipment adjusts calculated transmit power for a probe signal prior to transmitting the probe signal to a communication system, comprising:

retrieving at least a portion of a latest protocol information that is received from the communication system, said portion including a local mean of radio signal strength indicator (RSSI) values of a system equipment serving the user equipment; and adjusting calculated transmit power for the probe signal based on the received portion.

18. The method of claim 17, wherein a value of the local mean informs the user equipment as to whether to increase or decrease transmit power used for transmitting a subsequent probe signal.

19. A method by which a user equipment transmits a probe signal to a communication system, comprising:

adjusting calculated transmit power for the probe signal based on at least a portion of a latest protocol information received from the communication system, said portion including a local mean of radio signal strength indicator (RSSI) values of a system equipment serving the user equipment; and transmitting the probe signal at the adjusted power.

20. The method of claim 19, wherein a value of the local mean informs the user equipment as to whether to increase or decrease transmit power used for transmitting a subsequent probe signal.

21. A method of sending protocol information containing data that enables a receiving user equipment to adjust transmit power at which it transmits a probe signal, comprising:

inserting an access parameter message containing a local mean of radio signal strength indicator (RSSI) values of a serving system equipment into the protocol message; and transmitting the protocol information to the user equipment.

\* \* \* \* \*